S. W. STIRK.
TOOL FOR SPREADING PISTON RINGS.
APPLICATION FILED FEB. 21, 1914.
1,119,374.
Patented Dec. 1, 1914.
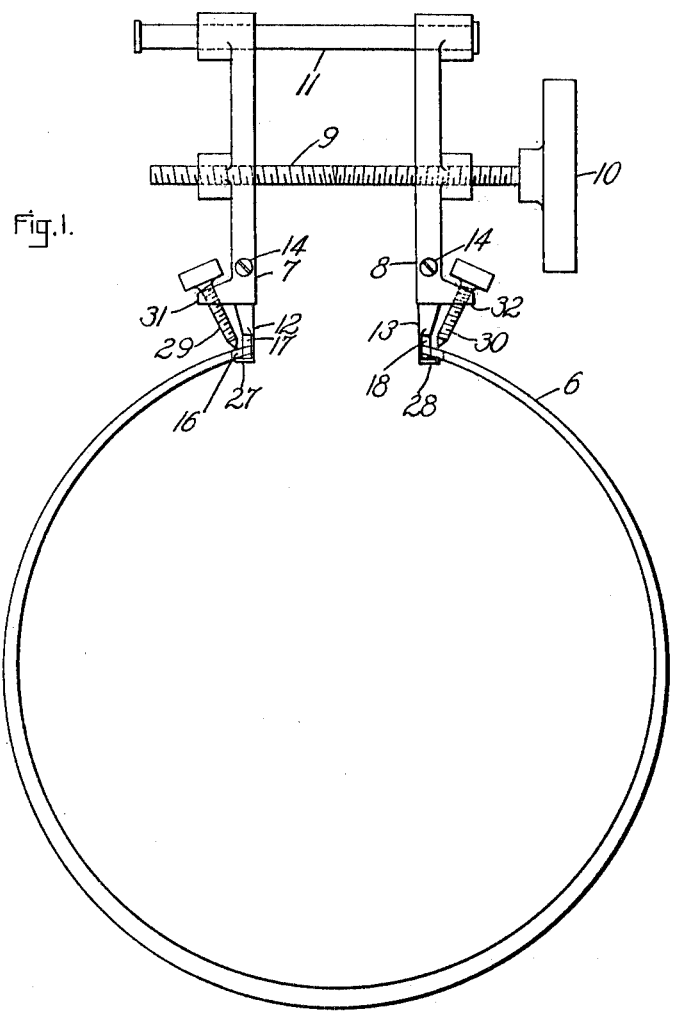

UNITED STATES PATENT OFFICE.

SYDNEY W. STIRK, OF SOMERVILLE, MASSACHUSETTS.

TOOL FOR SPREADING PISTON-RINGS.

1,119,374.   Specification of Letters Patent.   Patented Dec. 1, 1914.

Application filed February 21, 1914. Serial No. 820,320.

*To all whom it may concern:*

Be it known that I, SYDNEY W. STIRK, a citizen of the United States, residing at Somerville, in the county of Middlesex and State of Massachusetts, have invented new and useful Improvements in Tools for Spreading Piston-Rings, of which the following is a specification.

This invention relates to a device which is adapted to be used for spreading apart the ends of split packing or piston rings such as are employed in the pistons of engines. At present the ends of these rings are spread apart by a very laborious and unhandy method in order to get the springs out of the annular grooves in the piston in which they are located.

The object of this invention is to provide a convenient, powerful and easily operated tool which will grip the ends of the packing ring and spread said ends apart so that the ring may be taken off of the piston head or put onto the piston head when it is desired to remove an old ring or to put on a new one.

In some cases the adjacent ends of the split packing ring are cut at right angles and in others they are inclined, some at one angle and some at another and it is the object of this invention to provide a device of the character set forth which will be adapted to engage and operate with any of said forms of packing rings, and with rings of any width or thickness, and further it is the object of this invention to provide a tool which, when it has spread the ends of a packing ring apart, will be locked so as to hold said ends spread apart until they are allowed to approach each other and the tool is removed.

The invention consists in a tool of the character described, substantially as set forth in the following specification and particularly as pointed out in the claims.

Referring to the drawings: Figure 1 is a plan view of my improved tool for spreading packing rings showing a packing ring in position clamped thereto. Fig. 2 is a detail end elevation of said tool. Fig. 3 is a diagram view illustrating the position of the jaws with relation to the beveled ends of a packing ring, the packing ring being shown broken. Fig. 4 is a view similar to Fig. 3 illustrating in diagram the jaws in connection with a packing ring, with the ends beveled in the opposite direction from those illustrated in Fig. 3. Fig. 5 illustrates a packing ring with squared ends and jaws applied thereto.

Like numerals refer to like parts throughout the several views of the drawings.

In the drawings, 6 is a packing ring and 7 and 8 are the jaws of the spreading tool. These jaws are moved toward and away from each other by means of a right and left hand screw 9 which is turned by means of a convenient handle 10. The jaws are kept in parallelism by means of a rod 11 upon which they are adapted to slide.

The jaws 7 and 8 have removable end pieces 12 and 13, respectively, which are fastened to their respective jaws by screws 14. The end piece 12, forming a portion of the jaw 7 (Fig. 3) has a face 15 which lies in a plane inclined to the plane in which said end piece 12 of the jaw 7 is movable and said face 15 is adapted to bear against the inclined end 16 of the split ring 6. Said end piece 12 has also an inclined face 17 which is inclined in the opposite direction to that of the face 15, so that the two inclined faces 17 and 15 form a wedge-shaped end on the portion 12. The end piece 13 has an inclined face 18 adapted to bear against the end 19 of the split ring 6 and said end piece 13 has another face 20 which is inclined at an opposite angle to the face 18, said faces 18 and 20 making a wedge. When the jaws are used to spread a split ring of the form having ends inclined as in the split ring 6 the faces 15 and 18 of the end pieces 12 and 13 come in contact with the inclined ends 16 and 19 of the split ring 6.

In Fig. 4 the end pieces of the jaws are shown as contacting with the inclined ends 21 and 22 of the split ring 23, in which case the inclined faces 17 and 20 of the end pieces 12 and 13 contact with the ends of the split ring 23.

In Fig. 5 the end pieces 12 and 13 are shown as bearing against the ends 24 and 25, respectively, of a split ring 26, the ends of which are cut off at right angles to the length of said split ring. The extreme ends of the end pieces 12 and 13 are provided with flanges 27 and 28, respectively, and the inner face of the split ring adjacent to its opposite ends is forced against these flanges by set-screws 29 and 30, respectively, said set-screws having screw-threaded engagement with ears 31 and 32 upon the jaws 7 and 8, respectively.

The general operation of the device hereinbefore specifically described is as follows: Assuming the ring 6 to be in position within the annular groove in the piston and that it is desired to remove said ring from said piston the ends 12 and 13 of the jaws 7 and 8 are brought into contact with the ends 16 and 19 of the split ring 6, with the faces 15 and 18, respectively, bearing against said inclined ends 16 and 19 and with the flanges 27 and 28 located inside the ring and bearing against the inner face thereof. The jaws are separated sufficiently to bring a slight tension upon the ring 6 and at that time the set-screws 29 and 30 are set against the outer surfaces of the ring so as to force the inner surfaces of the ring against the flanges 27 and 28, respectively, and said screws, having pointed ends, when set against the outer surface of the ring with sufficient force, will dig into said outer face and thus prevent sidewise movement of the ends of the ring upon the flanges 27 and 28. The device is now clamped to the ring 6 in position to spread said ring to an extent sufficient to enable the same to be easily removed from the piston and this is accomplished by rotating the screw 9 in the proper direction by means of the handle 10 until the ring 6 has been spread sufficiently to enable it to be easily removed from the piston. The screw 9 is then rotated in the opposite direction and the opposite ends of the split ring will approach each other until the ends of the ring assume their normal position relatively to each other, whereupon a further rotation of the screw 9 in the same direction will cause the ends 12 and 13 of the jaws 7 and 8 to be freed from the ends of the split ring.

The same process is practically repeated in spreading the ring so as to place it upon the piston and releasing the tool therefrom.

By making the ends 12 and 13 of the jaws 7 and 8 of a wedge-shape and facing said wedges in opposite directions, respectively, it will be seen that the ends of the jaws are adapted to fit the beveled ends of split rings whether they are inclined like the ends 16 and 19 of the ring 6 or like the ends 21 and 22 of the ring 23 and also said ends of the jaws are adapted to bear against and spread the square ended ring 26. In each case the set-screws 29 and 30 are employed to clamp the ends of the ring against the flanges 27 and 28 of the end pieces of the jaws.

It will be noted that the inner faces of the end pieces 12 and 13 are practically flush with the inner faces of the jaws 7 and 8, thus allowing said end pieces to be brought almost into contact with each other so that the flanges 27 and 28 may be inserted between the ends of a split ring which has its ends separated only to a slight extent. It will further be noted that the set-screws 29 and 30 have pointed ends and that said ends bear against the outer surfaces of the end portions of the split ring at points inside the outer edges of said flanges 27 and 28, respectively, the result being that as the jaws 12 and 13 are forced apart the ends of the ring will tend to tip upon the extreme outer edges of the flanges 27 and 28 as pivots and will tend to move away from said flanges against the pointed ends of the screws 29 and 30, so that as the split packing ring has its ends forced apart, these ends will be more firmly clamped by the set-screws 29 and 30 to the jaws 12 and 13. It will also be seen that any width or thickness of packing ring can be operated upon to spread the ends thereof by means of the tool hereinbefore described, in view of the fact that the ends of the packing ring are held against the faces of the flanges 27 and 28 by the movable clamping means or screws 29 and 30.

Having thus described my invention, what I claim and desire by Letters Patent to secure is:

1. A tool for spreading a split packing ring having, in combination, a pair of jaws and means adapted to move said jaws toward and away from each other, the end of each jaw having a face lying in a plane inclined to the plane in which said jaws are movable and adapted to bear against one end of said ring, respectively, and means movably mounted on each of said jaws respectively adapted to clamp one end of said split ring thereto.

2. A tool for spreading a split packing ring having, in combination, a pair of jaws wedge-shaped in cross section, said wedges being oppositely disposed, and means adapted to move said jaws toward and away from each other, one side of said wedge in each of said jaws being adapted to bear against one end of said packing ring, respectively, and means movably mounted on each of said jaws respectively adapted to clamp one end of said split ring thereto.

3. A tool for spreading a split packing ring having, in combination, a pair of jaws, a screw adapted to move said jaws toward and away from each other, the end of each jaw having a face lying in a plane inclined to the plane in which said jaws are movable and adapted to bear against one end of said ring respectively and means movably mounted on each of said jaws respectively and adapted to clamp the end portions of said split ring to said faces.

4. A tool for spreading a split packing ring having, in combination, a pair of jaws wedge-shaped in cross section, said wedges being oppositely disposed, means adapted to move said jaws toward and away from each other, one side of said wedge in each of said jaws being adapted to bear against one end of said packing ring respectively, and means movably mounted on each of said jaws, respectively, and adapted to clamp the end portions of said split ring to said sides of said wedge.

5. A tool for spreading a split packing ring having, in combination, a pair of jaws, means adapted to move said jaws toward and away from each other, the extreme end of each of said jaws having a flange thereon and a beveled face adjacent to said flange and adapted to bear against one end of said split ring, respectively, and means movably mounted on each of said jaws respectively adapted to clamp one end of said split ring thereto.

6. A tool for spreading a split packing ring having, in combination, a pair of jaws, means adapted to move said jaws toward and away from each other, the extreme end of each of said jaws having a flange thereon and a beveled face adjacent to said flange and adapted to bear against one end of said split ring, and a set-screw adapted to bear against the outer face of said ring and force one end thereof against said flange.

7. A tool for spreading a split packing ring having, in combination, a pair of jaws and means adapted to move said jaws toward and away from each other, the extreme end of each of said jaws having a flange thereon and a face adjacent to said flange arranged to bear against one end of said split ring, respectively, and means movably mounted on each of said jaws respectively adapted to clamp one end of said split ring thereto.

8. A tool for spreading a split packing ring having, in combination, a pair of jaws, means adapted to move said jaws toward and away from each other, the extreme end of each of said jaws having a flange thereon and a face adjacent to said flange arranged to bear against one end of said split ring and a set-screw having screw-threaded engagement with each of said jaws, respectively, and adapted to bear against the outer face of said split ring and force one end thereof against said flange.

9. A tool for spreading a split packing ring having, in combination, a pair of jaws and means adapted to move said jaws toward and away from each other, each of said jaws constructed and arranged to engage one end of said split ring, respectively, and means movably mounted on each of said jaws, respectively, adapted to clamp one end of said split ring thereto.

10. A tool for spreading a split packing ring having, in combination, a pair of jaws and means adapted to move said jaws toward and away from each other and to lock said jaws in position at different distances from each other, each of said jaws constructed and arranged to engage one end of said split ring, respectively, and means movably mounted on each of said jaws, respectively, adapted to clamp one end of said split ring thereto.

11. A tool for spreading a split packing ring having, in combination, a pair of jaws, means slidably connecting said jaws together, a screw adapted to move said jaws toward and away from each other, each of said jaws constructed and arranged to engage one end of said split ring, respectively, and means movably mounted on each of said jaws, respectively, adapted to clamp one end of said split ring thereto.

12. A tool for spreading a split packing ring having, in combination, a pair of jaws, means adapted to move said jaws toward and away from each other, the extreme end of each of said jaws having a flange thereon and a face adjacent to said flange arranged to bear against one end of said split ring and a set-screw with a pointed end having screw-threaded engagement with each of said jaws, respectively, said pointed end adapted to bear against the outer face of said split ring at a point inside the outer edge of said flange and adapted to force one end of said split ring against said flange.

In testimony whereof I have hereunto set my hand in presence of two subscribing witnesses.

SYDNEY W. STIRK.

Witnesses:
Charles S. Gooding,
Sydney E. Taft.

Copies of this patent may be obtained for five cents each, by addressing the "Commissioner of Patents, Washington, D. C."